UNITED STATES PATENT OFFICE.

OLIVER C. WASHBURN, OF PHILADELPHIA, PENNSYLVANIA.

IMPROVED COMPOSITION FOR MAKING OIL-CLOTH.

Specification forming part of Letters Patent No. 34,453, dated February 18, 1862.

*To all whom it may concern:*

Be it known that I, OLIVER C. WASHBURN, of the city and county of Philadelphia, in the State of Pennsylvania, have invented a new and Improved Mode of Manufacturing Coating-Paste for the Manufacture of Oil-Cloths in all their Varieties; and I do hereby declare that the following is a full and exact description thereof, reference being had to the accompanying statement of ingredients and their proportions as used by me.

The nature of my invention consists in forming a composition by uniting oil sweetmeats, boiled oil, white vitriol, carbonate of ammonia, lamp black, oil light daub, and water; and to enable others skilled in the art to make and use my invention I have hereunto annexed the exact proportions of the ingredients as used by me in the manufacture of my coating-paste. For the first coat: oil sweetmeats, eighty-six pounds; oil, boiled, one hundred and eighty-eight pounds; white vitriol, one and one-fourth pound; carbonate of ammonia, nine pounds; lamp-black, seventy-six pounds; aqua, three hundred pounds. For the second, third, and fourth coatings: oil sweetmeats, eighty-six pounds; oil, boiled, one hundred and thirty-six pounds; oil light daub, forty pounds; white vitriol, three-fourths pound; carbonate of ammonia, six pounds; lamp-black, seventy-nine pounds; aqua, two hundred pounds. Coating for enameled goods: oil, boiled, two hundred and eighty-six pounds; white vitriol, one and one-fourth pound; carbonate of ammonia, nine pounds; lamp-black, seventy pounds; aqua, three hundred pounds. Oil light daub is made by boiling linseed-oil over a slow fire for six hours, adding to each gallon of oil one ounce each of red litharge and umber. Oil sweetmeats is composed of the same ingredients as daub, only it requires a much stronger heat to perfect it. After it is sufficiently baked it is cut or reduced with drying linseed-oil to the consistency of common tar. I mix the ingredients for my coating-paste as follows: First take oil sweetmeats and mix with it lamp-black or other coloring-matter; then I mix white vitriol, carbonate of ammonia, and water together and unite the two mixtures.

What I claim as my invention, and desire to secure by Letters Patent, is—

The new mode of making coating-paste for the manufacture of oil-cloths in all their varieties by a combination of carbonate of ammonia, white vitriol, boiled oils, and water, substantially as set forth.

OLIVER C. WASHBURN.

Witnesses:
   J. H. BRYAN,
   WILLIAMS OGLE.